United States Patent [19]
Rachid

[11] Patent Number: 5,669,220
[45] Date of Patent: *Sep. 23, 1997

[54] METHOD AND DEVICE FOR OPERATING THE WATER/STEAM CYCLE OF A THERMAL POWER STATION

[75] Inventor: Nabil Rachid, Ladenburg, Germany

[73] Assignee: ABB Patent GmbH, Mannheim, Germany

[21] Appl. No.: 314,890

[22] Filed: Sep. 29, 1994

Related U.S. Application Data

[63] Continuation of PCT/EP94/00167 Jan. 22, 1994.

[51] Int. Cl.[6] ................................................ F01K 9/00
[52] U.S. Cl. ........................... 60/654; 60/646; 60/657
[58] Field of Search ........................... 60/654, 670, 645, 60/646, 657, 649, 676

[56] References Cited

U.S. PATENT DOCUMENTS

| | | | |
|---|---|---|---|
| 3,336,747 | 8/1967 | Applebaum et al. | 60/657 |
| 4,003,205 | 1/1977 | Matsumura | 60/664 |
| 4,471,618 | 9/1984 | Tratz et al. | 60/657 |
| 4,776,170 | 10/1988 | Blangetti | 60/689 |
| 4,896,500 | 1/1990 | Pavel et al. | 60/646 |
| 5,215,448 | 6/1993 | Cooper | 417/423.5 |

FOREIGN PATENT DOCUMENTS

| | | |
|---|---|---|
| 0 149 677 | 7/1985 | European Pat. Off. |
| 2 404 103 | 4/1979 | France. |
| 878 804 | 6/1953 | Germany. |
| 1 152 111 | 8/1963 | Germany. |
| 2 228 232 | 12/1973 | Germany. |
| 31 10 364 | 12/1982 | Germany. |
| 41 39 140 | 6/1993 | Germany. |
| 1 320 462 | 6/1987 | U.S.S.R. |

*Primary Examiner*—James C. Yeung
*Assistant Examiner*—Alfred Basichas

[57] ABSTRACT

A method of operating a water/steam cycle of a thermal power station, for example a steam power station, combined heat and power station or combined cycle power station, having a preheating section for condensate, a steam generator, a steam turbine with a condenser, a condensate treatment system downstream of the condenser, and at least one condensate pump upstream of the condensate treatment system. The treated condensate is subjected to tapped steam from the steam turbine and/or from a steam reheat system in the preheating section and is heated thereby before it is supplied to the steam generator. The condensate is subjected to a pretreatment before reaching the preheating section and its degasification is dispensed with when it subsequently flows through the preheating section. A water/steam cycle of a thermal power station includes a preheating section, a steam generator, a steam turbine downstream of the steam generator, a condenser and a condensate treatment system downstream of the condenser. The preheating section has at least one low-pressure and/or high-pressure preheater and at least one feed pump for feeding condensate from the preheating section into the steam generator.

17 Claims, 1 Drawing Sheet

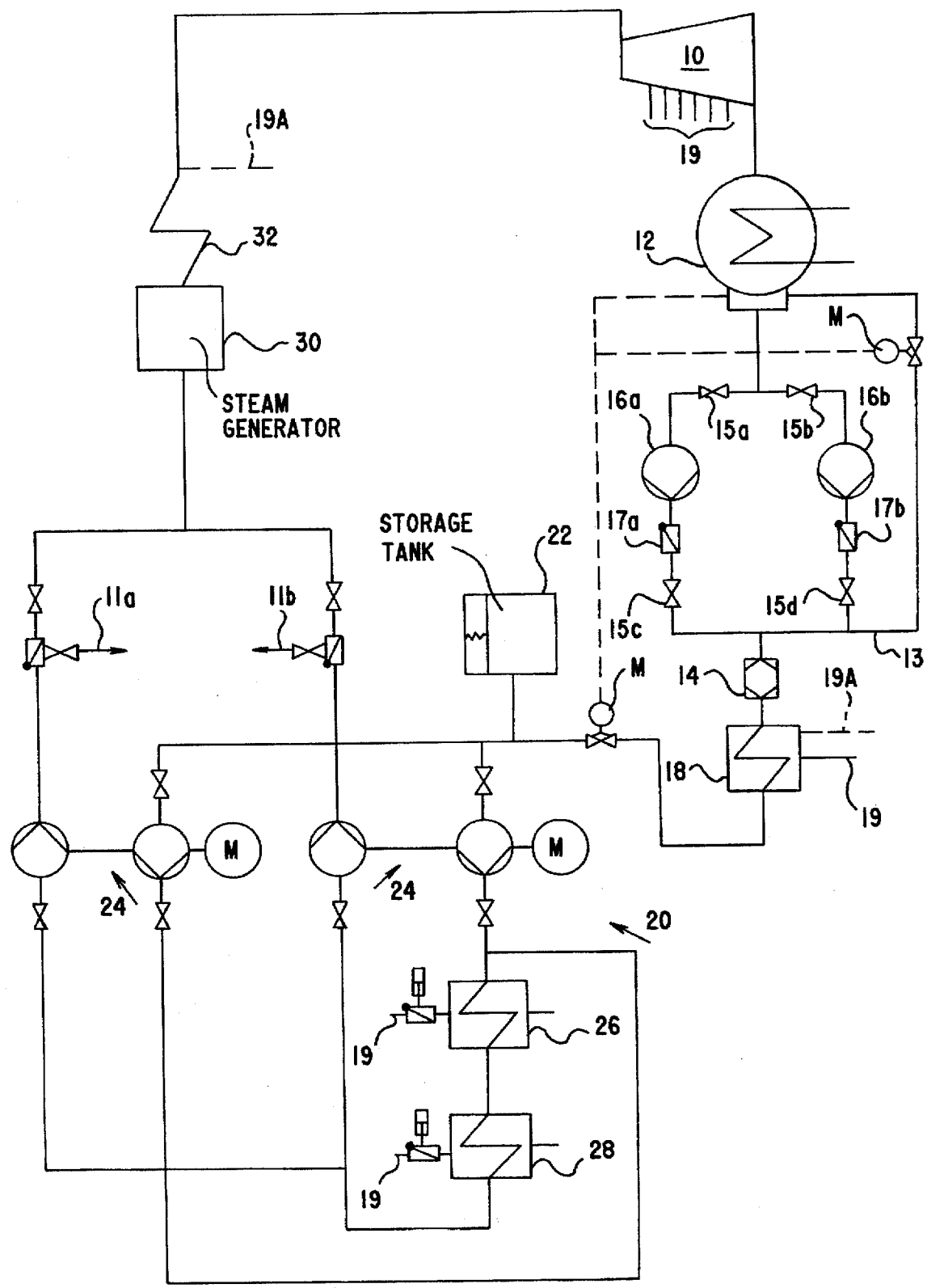

METHOD AND DEVICE FOR OPERATING THE WATER/STEAM CYCLE OF A THERMAL POWER STATION

CROSS-REFERENCE TO RELATED APPLICATION

This application is a continuation of International Application Ser. No. PCT/EP94/00167, filed Jan. 22, 1994.

BACKGROUND OF THE INVENTION

FIELD OF THE INVENTION

The invention relates to a method for operating a water/steam cycle of a thermal power station, for example a steam power station, combined heat and power station or combined cycle power station, having a pre-heating section for condensate, a steam generator, a steam turbine with a condenser, a condensate treatment system downstream, and condensate pumps upstream, wherein the treated condensate is subjected, in the preheating section, to tapped steam from the turbine and/or from a steam reheat system and is heated thereby before it is supplied to the steam generator. The invention also relates to a device for carrying out the method.

In thermal power stations, it is generally known to treat the water provided for steam generation and to preheat it in a preheating section to suit the design data of the thermal power station used as the basis for the steam generator and the steam turbine connected downstream thereof. That means raising the treated water, which is referred to as condensate and is provided for evaporation, to the necessary pressure and temperature level at the inlet to the steam generator.

It is furthermore general practice in thermal power stations for the preheating section to have at least one low-pressure (LP) preheater, a feed-water tank with a degasifier and a high-pressure (HP) pre-heater. The condensate originating from the turbine condenser is then initially treated in a condensate treatment system, for example a condensate cleaning system, and is delivered by means of condensate pumps through the low-pressure preheaters to the feed-water tank. The degasification of the condensate takes place there, by means of spray degasification for example, in order to remove oxygen and inert gases from the condensate. Boiling conditions are present in the feed-water tank as an interaction with the degasification and because of the heat supplied by means of the steam to which the condensate is subjected and which is tapped from the steam turbine.

The heating of the condensate takes place at a plurality of locations in the preheating section for the purpose of raising the condensate to the necessary pressure and temperature level. The tap locations in the steam turbine are matched to the feed-in locations in the preheating section with respect to pressure and temperature.

The feed-water tank is used as the storage tank for feed water, which is supplied to the steam generator through the high-pressure preheaters by means of feed pumps. In addition, it is conventional to place a condensate tank in the low-pressure region of the preheating section. The condensate tank is intended to make good any losses of condensate.

The feed-water tank, the preheater and the connecting piping have to be constructed with enough strength to meet the respective loads and that has consequential effects on the manufacturing costs of the preheating section because of the material selection which is necessary and the associated manufacturing requirements. It is, therefore, a general requirement for power station manufacturers and operators to find or create possibilities which permit the costs of erecting a thermal power station to be kept low.

SUMMARY OF THE INVENTION

It is accordingly an object of the invention to provide a method and a device for operating the water/steam cycle of a thermal power station, which overcome the hereinafore-mentioned disadvantages of the heretofore-known methods and devices of this general type, which are simple and which permit erecting and operating costs of a thermal power station to be reduced.

With the foregoing and other objects in view there is provided, in accordance with the invention, in a method of operating a water/steam cycle or circuit of a thermal power station, for example a steam power station, combined heat and power station or combined cycle power station, having a preheating section for condensate, a steam generator connected to the preheating section, a steam turbine connected to the steam generator, a condenser connected to the steam turbine, a condensate treatment system downstream of the condenser, and condensate pumps upstream of the condensate treatment system, which includes subjecting treated condensate from the condensate treatment system, in the preheating section, to tapped steam from the steam turbine and/or from a steam reheat system connected to the steam generator, for heating the treated condensate before supplying it to the steam generator, the improvement which comprises subjecting the condensate to a pretreatment before reaching the preheating section for dispensing with degassing of the condensate and supplying the condensate to the steam generator without degassing measures being carried out.

This provides for the condensate to be subjected to pretreatment before reaching the preheating section and, by dispensing with a degassing treatment, for the condensate to be supplied to the steam generator without degassing measures being carried out.

In accordance with another mode of the method according to the invention, as a pretreatment, the treated condensate is dosed with alkali salts and oxygen and is stored in a condensate tank which is connected into the preheating section.

In accordance with a further mode of the method according to the invention, steam extraction for heating cold condensate is dispensed with in an operating condition of the thermal power station referred to as "frequency stabilization" (in which the turbine is operated with maximum steam admission) and without shut-off elements being necessary in the tap piping, as was previously conventional. In order to generate the required steam quantity in this operating condition, condensate can be fed from the condensate tank until the latter has been emptied.

With the objects of the invention in view, there is also provided a water/steam cycle of a thermal power station, comprising a preheating section; a steam generator connected to the preheating section; a steam turbine connected down-stream of the steam generator; a condenser connected to the steam turbine; and a condensate treatment system connected downstream of the condenser; the preheating section having at least one low-pressure preheater and/or a high-pressure preheater and at least one feed pump for feeding condensate from the preheating section into the steam generator.

In an advantageous further development of the invention, depending on the spatial possibilities, the feed pump can be disposed before or after the pre-heaters or between them in the case of a subdivision into two preheating groups.

In accordance with another feature of the invention, the feed pump is constructed in two stages as a backing pump and a main pump and, in a preferred construction, the backing pump and the main pump are spatially separated from one another, for example before and after a preheater, and are acted upon by a common drive motor. In particular, this has the advantage of permitting the preheater to be constructed for lower pressure and therefore to be manufactured at low cost, while the high feed pressure at high temperature for feeding into the steam generator is generated behind the preheater, as viewed in the flow direction.

In accordance with a further feature of the invention, there is provided a condensate tank included as a storage tank in the preheating section, the storage tank acting as a supply for the feed pump.

In accordance with an added feature of the invention, the condensate tank is connected into the preheating section at the beginning of the latter because the demands with respect to pressure and temperature are relatively low at this point and therefore the costs for its manufacture can be kept low in view of the lower material requirements.

In accordance with a concomitant feature of the invention, the condensate tank has a pressure buffer which can be optionally formed by steam or nitrogen.

An essential advantage of the method according to the invention and of the device provided for carrying it out is that all of the components of the preheating section are subjected to lower loads than were previously conventional and can therefore be manufactured at lower cost.

As a further result of the method according to the invention, the condensate cleaning system, which is not counted as part of the preheating section, can be constructed for low pressure because the pressure in the adjoining preheating section is likewise low. The condensate storage tank disposed at the beginning of the preheating section is fed with treated condensate with the aid of main condensate pumps, which were also previously conventional, in which the condensate has been previously cleaned in the condensate cleaning system and is subsequently preheated in the low-pressure preheaters, which are charged with tapped steam from the low-pressure turbine, through tapped steam locations which cannot be shut off. The condensate tank accepts condensate in the non-boiling condition and is used as a supply tank for the feed pumps. As already mentioned, the feed pumps are respectively formed of backing pumps and main pumps, with it being possible to construct the backing pump in a simpler manner relative to the previously conventional standard because no boiling water flows to it and it is not therefore necessary to protect the pump against boiling water in the event of a reduction in pressure. The heating of the condensate to the required final temperature corresponding to the inlet temperature to the steam generator always takes place through feed pipes by means of tapped steam from the steam turbine.

The final pressure of the backing pump is independent of the pressure loss of the preheating line and of the permissible inlet pressure of the main feed pump. This pressure ratio can be optimized in such a way that a lower pressure than the respective tap pressure is present, on the water side, in each preheater. This makes it possible to simplify the turbine protection device. In addition, the conventional rapid-action by-pass valves of the high-pressure preheaters, which are controlled by the medium itself, can be replaced by normal electrically driven valves if a by-pass should still be necessary for availability reasons. A further advantage follows from the fact that the preheaters, which are located upstream of the steam generator, can likewise be constructed for low pressure, for example 16 to 25 bar, instead of the rated pressure of 200 to 300 bar.

The operating condition for stabilizing frequency in the supply network by controlling the tap is also easier to plan if the device according to the invention is used and it furthermore offers a larger control range, depending on the number of preheating stages in the preheating section.

As a final advantage, it should be mentioned that the hot condensates can be cascaded as far as, and including, the turbine condenser so that a thermodynamically favorable use of the power station process is possible. Due to the further reduction in the condensate temperature which can be achieved in this way, 100% feed-water desalination is possible in the condensate cleaning system. A steam buffer is used to prevent uncontrolled oxygen intrusions into the condensate tank. In the case of installations in which auxiliary steam is not available from an outside source, this steam buffer can be replaced by a nitrogen buffer before starting or until restarting takes place.

Other features which are considered as characteristic for the invention are set forth in the appended claims.

Although the invention is illustrated and described herein as embodied in a method and a device for operating the water/steam cycle of a thermal power station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single figure of the drawing is a schematic circuit diagram of a water/steam cycle of a thermal power station.

DESCRIPTION OF THE PREFERRED EMBODIMENTS

Referring now to the single figure of the drawing in detail, there is seen a circuit diagram of a water/steam cycle of a thermal power station which is produced in accordance with the invention. Components which are unimportant with respect to the invention are not represented in detail.

A condenser 12 adjoins an outlet of a conventional steam turbine 10 and supplies condensate which is cleaned and pretreated in a condensate treatment system or plant 14 disposed downstream. A feed to the condensate treatment system takes place in two lines, each line having a main condensate pump 16a, and 16b shut-off valves 15a, 15b, 15c and 15b and a non-return valve 17a and 17b.

The condensate treatment system 14 has an outlet end which is connected to a first preheater 18 that is subjected to steam from the turbine 10 through a tap 19 and from a superheating steam reheat system 32 through a tap 19a. The condensate treatment system 14 has an inlet end which is directly connected to the condenser 12 through a by-pass pipe 13.

A so-called preheating section 20 begins with the first preheater 18 and also includes feed pumps 24, a second preheater 26 and a third preheater 28. A condensate storage tank 22, as its name states, accepts condensate and is used in the illustrated circuit diagram as a supply for the feed pumps 24 which are connected in parallel with one another and supply the second and third preheaters that are disposed downstream, from which the heated condensate leads to a steam generator 30 with a subsequent superheating steam reheat system 32.

In contrast to conventional power stations, a striking feature of the present circuit diagram according to the invention is that neither a feed-water tank nor a degasifier, which is usually integrated in the feed-water tank, are provided in the whole of the preheating section 20. The reason for this is that the condensate is subjected to pretreatment in the condensate treatment system 14 so that degassing of the heated condensate is unnecessary.

A further difference relative to conventional power stations is that the condensate tank 22 is not associated with the condensate treatment as is usual, but is integrated in the preheating section, as is shown.

Downstream of the connection location of the condensate tank 22, as viewed in the flow direction, the preheating section 20 divides into two parallel lines which are each equipped with a first stage of the feed pump 24 that is constructed in two stages. Downstream of the first stage of the feed pump 24, the two lines are reunited and lead to the second preheater 26, downstream of which the third preheater 28 is connected. In this respect, it should be pointed out that the overall pressure level of the pre-heating section is set very low. The main purpose of this is to be able to construct both the upstream condensate treatment system 14 and the components of the pre-heating section 20 to suit this low pressure and, as a result, to be able to manufacture the components of the preheating section 20 at low cost by appropriate material selection and material cross-sections. This applies both for the first and second preheaters 18, 26 as well as for the third preheater 28. The pressure of the preheating section, corresponding to the feed-water pressure in conventional thermal power stations, is only generated by the second stage of the feed pump 24, which is again connected in a parallel configuration downstream of the third preheater 28, which has respective minimum quantity pipes 11a and which is jointly led to the steam generator 30.

The deliberately selected low temperature and pressure levels have the result of ensuring that the water present in the condensate tank is not in the boiling condition. In consequence, it is not necessary to provide any special measures to deal with boiling water in the event of pressure reductions when constructing the first stage, which is the so-called backing pump, of the feed pumps 24. The final pressure of the backing pump depends on the pressure loss of the preheating line and on the permissible inlet pressure to the second stage of the feed pump, which is the so-called main pump. The backing pump and the main pump are spatially separated from one another and have a common drive motor M.

A particular feature of the illustrated power station circuit is that the feed to the preheating section 20 from the condensate treatment system can be interrupted for a "frequency stabilization" operating condition so that steam extraction from the turbine for the purpose of preheating the entering cold condensate does not take place. The steam turbine 10 can therefore be operated with maximum thermal output without condensate make-up until the condensate tank 22 has been emptied.

I claim:

1. In a method of operating a water/steam cycle of a thermal power station having:
   a preheating section for condensate, a steam generator connected to the preheating section, a steam turbine connected to the steam generator, a condenser connected to the steam turbine, a condensate treatment system downstream of the condenser, and condensate pumps upstream of the condensate treatment system, the method which comprises:
   subjecting the condensate to a pretreatment before reaching the preheating section without degassing the condensate, and supplying the condensate to the steam generator without degassing measures being carried out, and
   subjecting treated condensate from the condensate treatment system to tapped steam in the preheating section for heating the treated condensate before supplying it to the steam generator.

2. The method according to claim 1, which comprises tapping the steam for the treated condensate from a steam reheat system connected to the steam generator.

3. The method according to claim 1, which comprises tapping the steam for the treated condensate from the steam turbine and from a steam reheat system connected to the steam generator.

4. The method according to claim 1, which comprises storing the condensate in a condensate storage tank connected into the preheating section.

5. The method according to claim 1, which comprises tapping the steam for the treated condensate from the steam turbine.

6. The method according to claim 5, which comprises dispensing with delivery of condensate to the preheating section in a frequency stabilization operating condition so that no steam is tapped from the steam turbine for the purpose of heating cold condensate.

7. A water/steam cycle of a thermal power station, comprising:
   a preheating section;
   a steam generator connected to said preheating section;
   a steam turbine connected downstream of said steam generator;
   a condenser connected to said steam turbine;
   a condensate treatment system connected between said condenser and said preheating section, said condensate treatment system treating condensate with alkali salts and oxygen for degassing the condensate; and
   said preheating section having at least one preheater and at least one feed pump for feeding condensate from said preheating section into said steam generator.

8. The water/steam cycle according to claim 7, wherein said at least one preheater is a low-pressure preheater.

9. The water/steam cycle according to claim 7, wherein said at least one preheater is a high-pressure preheater.

10. The water/steam cycle according to claim 7, wherein said at least one preheater includes a low-pressure preheater and a high-pressure preheater.

11. The water/steam cycle according to claim 7, wherein said feed pump has a two-stage construction with a backing pump and a main pump.

12. The water/steam cycle according to claim 11, wherein said backing pump and said main pump are spatially separated from one another and have a common drive motor.

13. The water/steam cycle according to claim 7, including a condensate storage tank connected into said preheating section.

14. The water/steam cycle according to claim 13, wherein said condensate storage tank is a supply for said feed pump.

15. The water/steam cycle according to claim 13, wherein said condensate storage tank has a pressure buffer.

16. The water/steam cycle according to claim 15, wherein said pressure buffer is a steam buffer.

17. The water/steam cycle according to claim 15, wherein said pressure buffer is a nitrogen buffer.

* * * * *

UNITED STATES PATENT AND TRADEMARK OFFICE
CERTIFICATE OF CORRECTION

PATENT NO : 5,669,220
DATED     : September 23, 1997
INVENTOR(S): Nabil Rachid

It is certified that error appears in the above-identified patent and that said Letters Patent is hereby corrected as shown below:

Title page,
Item [30] should read as follows:

Jan. 29, 1993  [DE]  Germany  ......... 43 02 486.6

Signed and Sealed this

Thirteenth Day of January, 1998

Attest:

BRUCE LEHMAN

*Attesting Officer*          *Commissioner of Patents and Trademarks*